United States Patent [19]

Tsuzuki et al.

[11] 4,415,249

[45] Nov. 15, 1983

[54] MOTOR DRIVE CIRCUIT FOR CAMERA

[75] Inventors: Hiroyoshi Tsuzuki, Yokohama; Ryuji Tokuda, Tokyo, both of Japan

[73] Assignee: Canon Kabushiki Kaisha, Japan

[21] Appl. No.: 372,792

[22] Filed: Apr. 28, 1982

[30] Foreign Application Priority Data

May 8, 1981 [JP] Japan ................................. 56-69908

[51] Int. Cl.$^3$ .......................... G03B 1/18; G05F 1/58; H02P 7/00

[52] U.S. Cl. .................................... 354/173; 307/297; 323/281; 318/139; 318/302

[58] Field of Search ..................... 354/173, 214, 25 R, 354/195, 204; 318/139, 301, 302, 341, 432, 268; 307/297; 323/281, 282, 313, 314

[56] References Cited

U.S. PATENT DOCUMENTS 3,828,240  8/1974  Keller et al. ...................... 323/281
3,909,835  9/1975  Ito et al. .............................. 354/204
4,085,359  4/1978  Ahmed .................................. 323/314
4,319,179  3/1982  Jett, Jr. ................................ 323/281

Primary Examiner—William B. Perkey
Attorney, Agent, or Firm—Toren, McGeady and Stanger

[57] ABSTRACT

A motor drive circuit for a camera which circuit is adapted to control a motor which is incorporated in a camera body, a film winder, a lens cylinder body or the like. The function of such a motor is to carry out film winding and rewinding, shutter charging and actuation of a taking lens for focusing or other photographic operations. The motor drive circuit is provided with a battery for supplying electric power to the motor and is arranged to control a motor driving current which is supplied to the motor and a control current which is not supplied to the motor but is used to control the motor driving current, so as to raise the efficiency of the use of the battery, i.e., to bring about longevity of the battery.

6 Claims, 5 Drawing Figures

MOTOR DRIVE CIRCUIT FOR CAMERA

BACKGROUND OF THE INVENTION

1. Field of the Invention

The present invention relates to a circuit, for example, for driving the film winder by means of a motor when the film in a camera is wound or rewound, particularly a motor drive circuit for a small device with a built-in battery, such as for a camera, in which the utilization efficiency of the battery is improved when the motor is driven.

2. Description of the Prior Art

Quite recently in the field of the camera, film winding shutter charging and lens focusing have become more automated. For example, in the case of film winding in general, the motor drive circuit for automatically winding the film is operatively engaged with the release of the camera in order to start the film winding motor immediately after the release, whereby the film for one picture frame is mechanically wound by the drive of the motor, and the number of the film perforations is detected in order to stop the motor. FIG. 5 shows an embodiment of the conventional motor drive circuit.

In FIG. 5, position 1 of the change over switch SW is the position taken when the film has been wound, position 2 is that taken when the film is to be wound and position 3 is that taken when the film is to be rewound. When the winding is complete, condenser C and motor M are short-circuited by the contact of switch SW at the position 1. When the change over switch SW is changed over to the position 2, in order to wind the film, the power source is switched on in such a manner that the base current flows through transistor Q2 via resistor R3 in order to bring transistor Q2 to the on state. The base current is supplied to transistor Q3 via resistor R4 to bring transistor Q2 to the on state, whereby motor M starts to wind the film.

When the film for one picture frame has been wound, the perforation of the film for the picture frame is detected and switch SW is mechanically moved to position 1.

When the film comes to the end and further winding is not possible, the lapse of a certain time, set by the value of the capacitance C and the resistor R, which is longer than that necessary for the film winding, allows the terminal voltage of the condenser C to reach a value sufficient to supply the base current to transistor Q1 which brings transistor Q1 to the on state so that transistors Q2 and Q3 are brought to the off state in order to stop the current supply to the motor. In the case of rewinding, switch SW is changed to position 3 and current is supplied to the motor independently of the motor driving time, set by the condenser C and the resistor R, in such a manner that the film is continuously rewound.

In the above circuit construction, the base current $I_B$ of transistor Q3 during the motor operation is as follows:

$$I_B \approx \frac{V_{BAT} - (V_{CE} + VH_{BE})}{R_4}$$

Hereby:

$V_{BAT}$: Power source voltage
$V_{CE}$: Switch on voltage between collector and emitter of Q2
$V_{BE}$: Voltage between base and emitter of Q3 wherein the dependency of $V_{CE}$ and $B_{BE}$ on the power source voltage is comparatively little while $I_B$ largely depends upon $V_{BAT}$ and R4.

On the other hand, in order to drive the motor in the camera, it is sufficient to supply a current corresponding to the load of the motor which may be film advancing or the charging of the various circuits. Generally, it is necessary that the motor be driven even when the power source voltage is low, for example, due to the consumption, in order to extend the life of the battery. In case the value of the R4 is made smaller to the extent that a necessary current can be delivered to transistor Q3 even when the power source voltage is low, the base current flowing through R4 is large, as is obvious from the above relation, when the power source voltage is high enough to drive the motor.

However, the increased part of the base current does not directly contribute to driving the motor. Further, the higher the power source voltage is, the less negligible the increase part of the base current is, making it necessary to avoid this wave of power consumption.

On the other hand, it is well known that the lower the current consumption of the battery, the larger the energy obtainable from the battery and the better the utilization efficiency of the battery.

SUMMARY OF THE INVENTION

It is, accordingly, an object of the present invention to provide an improved motor drive circuit for the photographing operation of a camera which overcomes the disadvantages of the prior art devices.

It is another object of the invention to provide a motor drive circuit so designed that excessive base current which contributes nothing to the direct drive of the motor, is prevented when the battery voltage is high by limiting the base current of the motor driving transistor to a certain, preferably constant, determined value.

It is a further object of the invention to provide a motor drive circuit for a camera so designed that the utilization efficiency of the battery is raised in such a manner that the motor is hardly influenced by the change of the battery voltage, due to the consumption of the battery, when the motor is driven.

It is a further object of the invention to provide a motor drive circuit for the camera so designed that too large a current, contributing nothing to the direct drive of the motor, is prevented, when the battery voltage is high, by limiting the base current of the motor driving transistor to a certain, preferably constant, determined value, while the utilization efficiency of the battery is raised in such a manner that the motor is hardly influenced by the change of the battery voltage, due to the consumption of the battery, when the motor is driven.

These and further objects and features of the invention will become apparent from the following detailed description of an embodiment thereof with reference to the accompanying drawings.

DESCRIPTION OF THE PREFERRED EMBODIMENTS

The present invention will be explained in detail in accordance with the accompanying drawings.

Figure 1:
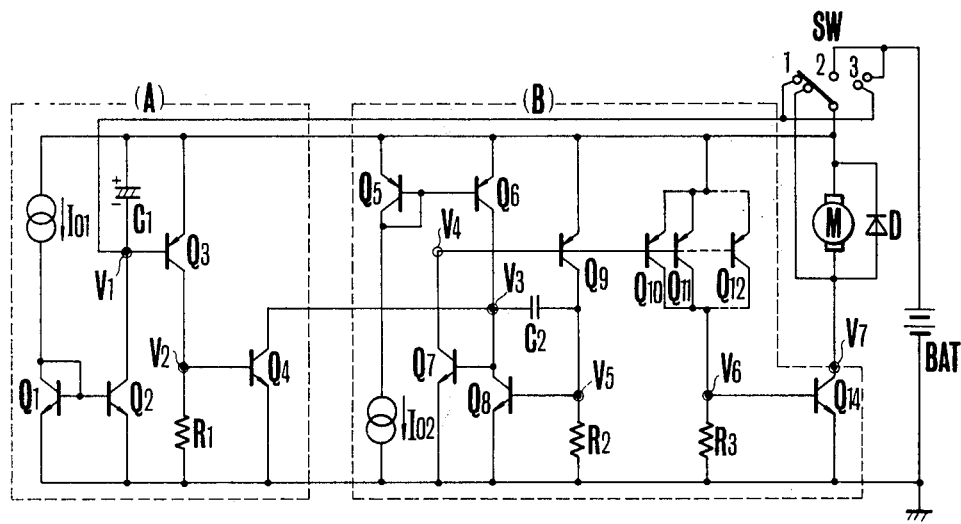
FIG. 1 shows an embodiment of the motor drive circuit of the present invention.

FIG. 1 shows an embodiment of the motor drive circuit of the present invention. In the drawing, Q1 is a transistor, the collector is connected to the base of transistors Q1 and Q2 and to the constant current I01. The emitters of transistors Q1 and Q2 are grounded, and the collector of transistor Q2 is connected to the negative terminal of the condenser C1 and the base of transistor Q3. The emitter of transistor Q3 and the positive terminal of condenser C1 are connected to the power source battery BAT via switch SW, while the collector of transistor Q3 is connected to the base of transistor Q4, grounded via resistor R1 and the negative terminal of the power source battery BAT. The collector of transistor Q4 is connected to the base of transistor R7 while the emitter transistor Q4 is grounded. Hereby, Q1 and Q2 constitute a conventional current mirror circuit designed so that a current of almost the same amount as that of I01, flows through the collector of Q2 and so that C1 is charged with a current of almost the same value as that of I01. When the amount charged in C1 reaches the threshold voltage between the emitter and the base of Q3, Q3 is brought from the off state to the on state and Q4 is brought to the on state. This much explains the circuit block [A] in a dotted line. Below, is the explanation of the circuit block [B] in a dotted line. The emitter of transistor Q5 and that of transistor Q6 are connected to the power source battery BAT via the switching position 2. The base of Q5 is connected to the base of Q6 and to the collector of Q5. The collector of Q5 is grounded via constant current circuit I02. The collector of transistor Q5 is connected to the collector of transistor Q4, condenser C2, the base of transistor Q7 and the collector of transistor Q8. The emitter of transistor Q7 is grounded, while the collector of Q7 is connected to the base of Q9, Q10, Q11 and Q12, whose emitters are connected to BAT via switching position. The collector of Q9 is connected to the contact terminal of C2 and the base of Q3 and grounded via resistor R2. The emitter of Q8 is grounded. The collectors of Q10, Q11 and Q12 are grounded via resistor R3 and connected to the base of transistor Q14, whose emitter is grounded and whose collector is connected to the negative terminal of motor M and the anode of diode D. The positive terminal of the motor is connected to the cathode of diode D and BAT via switching position 2 of switch SW.

The transistors Q5 and Q6 constitute a current mirror circuit, whereby the collector current of Q6 is constant and partially the base current of Q7.

Thus, when a current is supplied to the circuit, Q7 is brought to the on state and accepts the base current of transistors Q9, Q10, Q11 and Q12, bringing Q9, Q10, Q11 and Q12 to the switched on state. The voltage drop in resistor R2 due to the collector current of Q9 serves as the bias between the base and the emitter of transistor Q8.

Namely, resistor R2 and transistors Q7, Q8 and Q9 constitute a negative feedback circuit in such a manner that the collector current of transistor Q9 is almost equal to the base-emitter voltage of transistor Q8 divided by the resistance R3, that is, almost constant.

Because the change due to the fluctuation of the power source voltage of the base-emitter voltage $V_{BE}$ of transistor Q8 is small, the change of the collector current of Q9, due to the fluctuation of the power source voltage, can also be kept small. The temperature coefficient of the base-emitter voltage $V_{BE}$ of a transistor is generally negative, therefore, it can be expected that the temperature coefficient of the collector current of Q9 is also negative. This is much more effective because the resistance generally has a positive temperature coefficient when the above circuit is integrated.

A common base current flows through transistors Q9, Q10, Q11 and Q12 so that essentially equal characteristics will result in their collector currents being equal. The equal characteristics can easily be obtained by integrating the circuit, and from such a circuit construction an amplified current, an integral number times larger than the collector current of transistor Q9, is obtained. The collector current of transistor Q14, which is the above current amplified $h_{FE}$ times, is the motor current so that it is also possible to set the base current by selecting R2 in such a manner that the above motor current is almost constant.

C2 is the phase compensation condenser for compensating the phase in the negative feedback loop. Diode D, connected in the reverse direction between the motor terminals, serves to observe the motor noise.

The operation of the above motor drive circuit will be explained in accordance with FIG. 4.

During the normal film winding operation, switch SW is in position 2. When the film has been wound, SW moves from [2] to [1]. The above movement of SW is carried out with a conventional mechanical detector by mechanically detecting one picture frame by counting the number of film perforations. The movement of SW from [1] to [2] is also carried out by mechanically detecting the exposure finishing signal from the camera. At the end of the film, there is no film winding completion signal issued so that SW remains at [2]. The rewind process is generally carried out with the operation of the manual switch, whereby SW is positioned at [3] and not at [1] and [2]. Also, in the case of the present embodiment, the change over switch of this mechanism is used.

Figure 4:
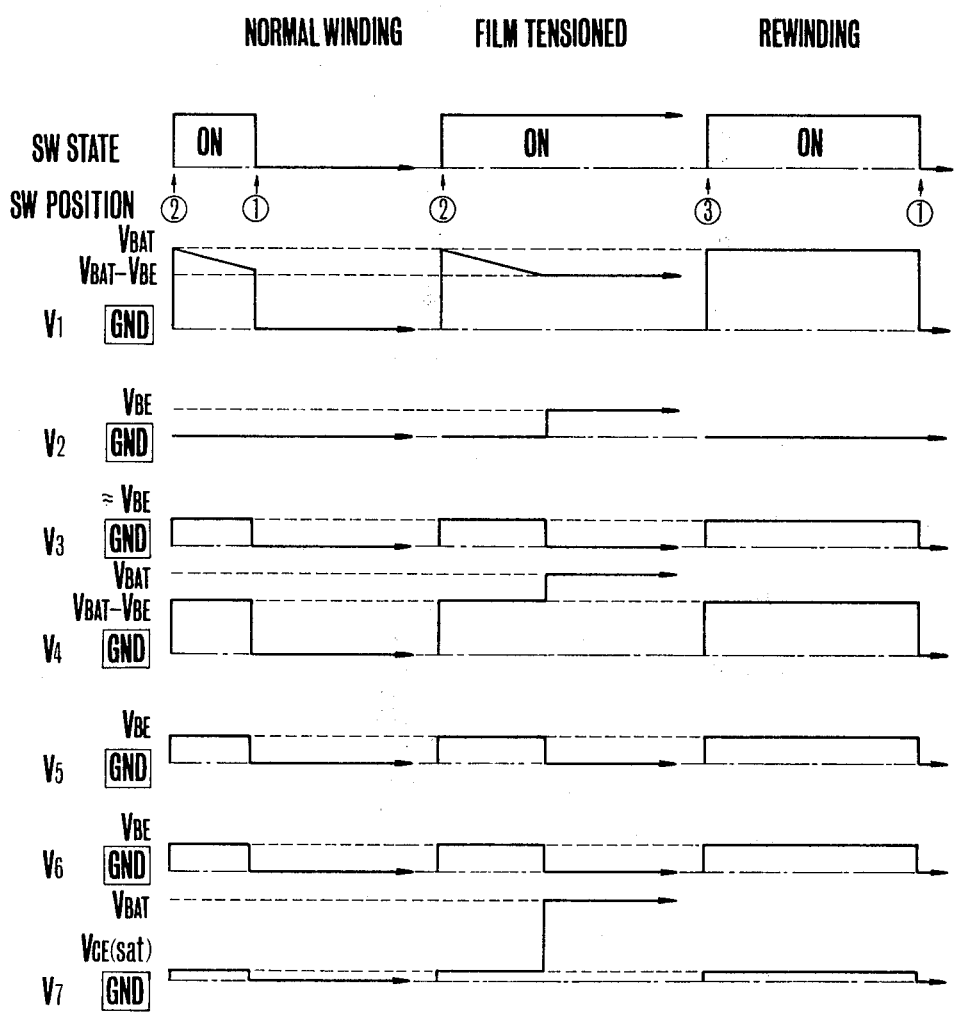
FIG. 4 shows the waveforms of the potentials V1–V7 at various points in FIG. 1 for explaining the operation of the motor drive circuit in FIG. 1.

FIG. 4 shows the voltage level to time relation of potentials V1–V7 at various points in FIG. 1.

V1 is the $V_{BAT}$ when the SW assumes position [2] and linearly decreased with the lapse of time. Before this voltage drop becomes the difference between the battery voltage and that between the base and the emitter voltages of transistor Q3 during the normal film winding, namely, $V_{BAT}-V_{BE}$, the film has been wound and SW moves from [2] to [1]. At the end of the film, the timer suspends the current supply to the motor at the time point at which V1 becomes $V_{BAT}-V_{BE}$ because this causes SW to remain at position [2].

On the other hand, at the time of film rewinding, the condenser is short-circuited by SW at the position [3], and V1 is always $V_{BAT}$, therefore, there is no timer function and rewinding continues until the SW is returned to [1].

As is shown in the drawing, V2–V7 correspond to the change of V1 with the lapse of the time at various positions of SW, and the motor is driven accordingly.

Figure 2:
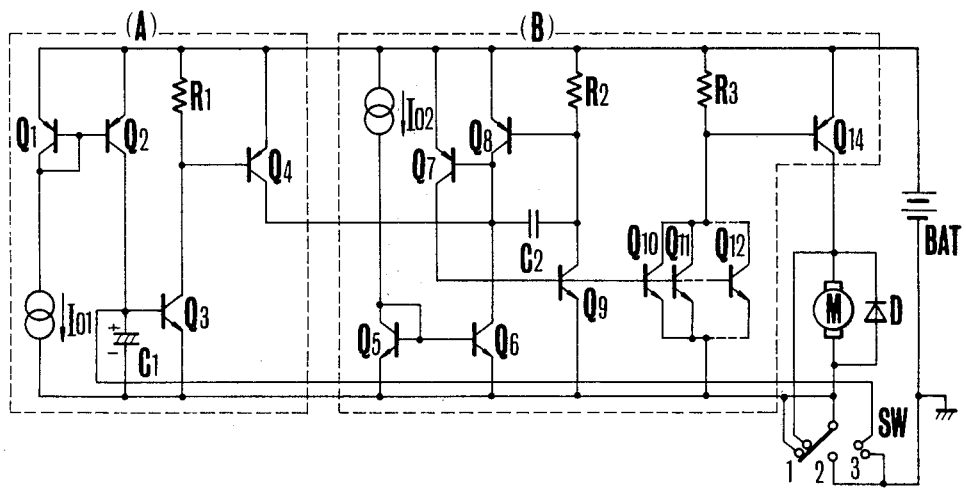
FIGS. 2 and 3 show the second and the third embodiments of the motor drive circuit of the invention.

FIG. 2 shows an embodiment, where the motor drive transistor Q14 is a pnp type transistor and is equivalent with the circuit in FIG. 1, so that its explanation is omitted.

Figure 3:
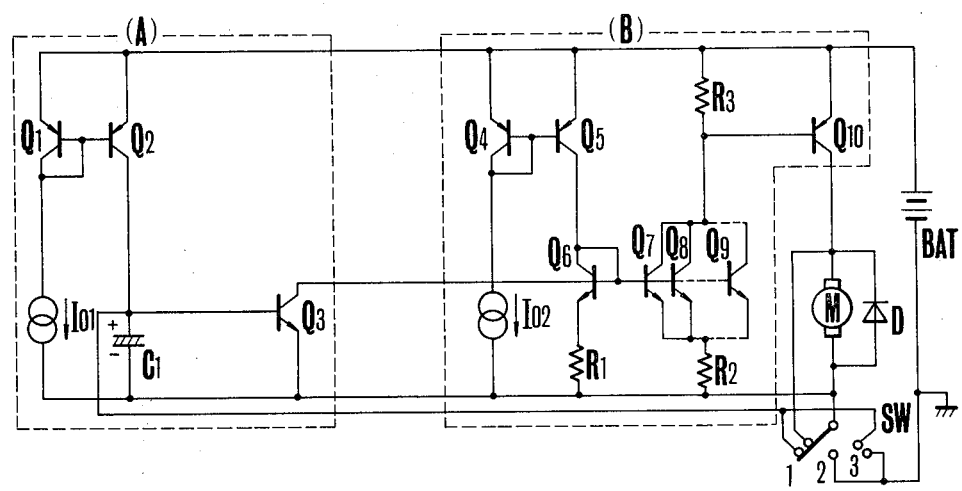
Figure 5:
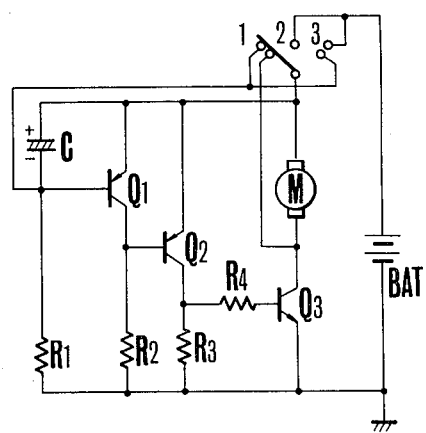
FIG. 5 shows the conventional motor drive circuit.

FIG. 3 shows another embodiment of the circuit, different from that in FIG. 2, where transistor Q14 is of the pnp type. Here, the characteristics of the elements in IC, particularly the difference between the characteristics of the pnp transistor and that of the npn transistor, are taken into consideration.

The circuit block [A] in FIG. 3 is almost equal to that in FIG. 1, so that the block [B] in FIG. 3 will be explained below.

Transistor Q6 is driven by the constant current from the constant current circuit I02 via the current mirror circuit consisting of transistors Q4 and Q6 in such a manner that the collector current of transistors Q7, Q8 and Q9, which constitute a current mirror circuit with Q6, is almost constant.

Therefore, the resistors R1 and R2 amplify the current counter-proportionally to their value.

Thus, the amplified constant current becomes the base current of transistor Q10. This base current can be set as any collector current of Q10, namely, the motor current, by properly adjusting R1 or R2.

As explained in accordance with the present invention, by connecting the motor drive transistor in series to the motor and, if possible, the constant current circuit or, when the power source voltage is high, the output limiting circuit to the base of the transistor so as to supply an almost constant current, it is possible to obtain the battery energy effectively, therefore, a larger current than is needed is not taken when the film is driven. This is accomplished by suppressing the battery load. Consequently, the number of the films to be fed, namely, the photographable films, can be increased for a given number of battery units. Further, the current supplied to the motor is substantially constant, therefore, excess current flows through the motor and motor damage can be avoided. The lower the temperature, the smaller is the current amplifying factor $h_{FE}$ of the transistor. On the other hand, if the circuits shown in FIGS. 1 and 2 make use of the threshold potential between the base and emitter of transistor Q8 as the negative feedback input, the threshold potential goes up with the temperature coefficient of $-2 - -3$ mV/°C. when the temperature falls down, namely, the constant current output has a negative temperature coefficient so that the current amplification factor $h_{FE}$ of the transistor can be temperature compensated. The circuits in the drawings can be integrated, which is quite effective for the cost, the fidelity and the compactness.

It goes without saying that the gist of the present invention is not limited to the film feeding motor drive circuit in small appliances in which the power source battery is incorporated but is also quite effective for other purposes for which there is a motor drive system. Namely, the drive circuit of the present circuit can be applied to a focus control device in which a motor is incorporated in the camera body or lens barrel for focusing the photographing lens, and other drive devices for controlling shutter charge device, the shutter drive device, etc.

What is claimed is:

1. A motor drive circuit having a battery as its first power source, comprising:
    (a) a first transistor to control current flowing to a motor;
    (b) second transistors to supply base current to said first transistor;
    (c) a third transistor being so arranged as having a common base with said second transistors;
    (d) a resistance to convert current flowing to said third transistor to a voltage;
    (e) a fourth transistor to detect an output voltage of said resistance, said fourth transistor for comparing said output voltage of the resistance with a voltage across the base and the emitter thereof;
    (f) a current source to supply current to the fourth transistor; and
    (g) a fifth transisor to invert an output of said fourth transistor and supply the thus inverted output to the base of the third transistor and the second transistors.

2. A motor drive circuit according to claim 1, further including:
    (a) a sixth transistor to short-circuit the output of the third transistor to ground when current is added to the base thereof; and
    (b) a time constant circuit which produces an output during film advance and supplies base current to the base of the sixth transistor.

3. A motor drive circuit having a battery as its power source, comprising:
    (a) a first transistor to control current flowing to a motor;
    (b) multi-transistors to supply base current to said first transistor;
    (c) a second transistor being so arranged as having a common base with said multi-transistors;
    (d) a resistance to convert current flowing to the second transistor to a voltage;
    (e) a third transistor to detect an output voltage of said resistance, said third transistor comparing said output voltage of the resistance with a voltage across the base and the emitter thereof;
    (f) a current source to supply current to the third transistor; and
    (g) a fourth transistor to invert an output of the third transistor and supply the thus inverted output to the base of the second transistor and the multi-transistor.

4. A motor drive circuit according to claim 3, further including:
    (a) a fifth transistor to short-circuit the output of the third transistor to ground when current is added to the base thereof; and
    (b) a time constant circuit which produces an output during film advance and supplies base current to the base of the fifth transistor.

5. A motor drive circuit having a battery as its power source, comprising:
    (a) a first transistor to control a current corresponding to a current flowing to a motor;
    (b) multi-transistors to supply a current corresponding to a base current to said first transistor;
    (c) a second transistor having a common base with said multi-transistors;
    (d) a resistance to convert a current flowing to said second transistor to a voltage;
    (e) a third transistor to detect an output voltage of said resistance, said third transistor comparing an output voltage of said resistance with a voltage across the base and the emitter thereof;
    (f) a current source to supply current to the third transistor; and
    (g) a fourth transistor to invert an output of said third transistor and supply the thus inverted output to the base of the second transistor and the multi-transistors.

6. A motor drive circuit according to claim 5, further including:

(a) a fifth transistor to short-circuit an output of the third transistor to ground when current is added to the base thereof; and (b) a time constant circuit which produces an output during film advance and supplies base current to the base of said fifth transistor.

* * * * *